Figure 13:
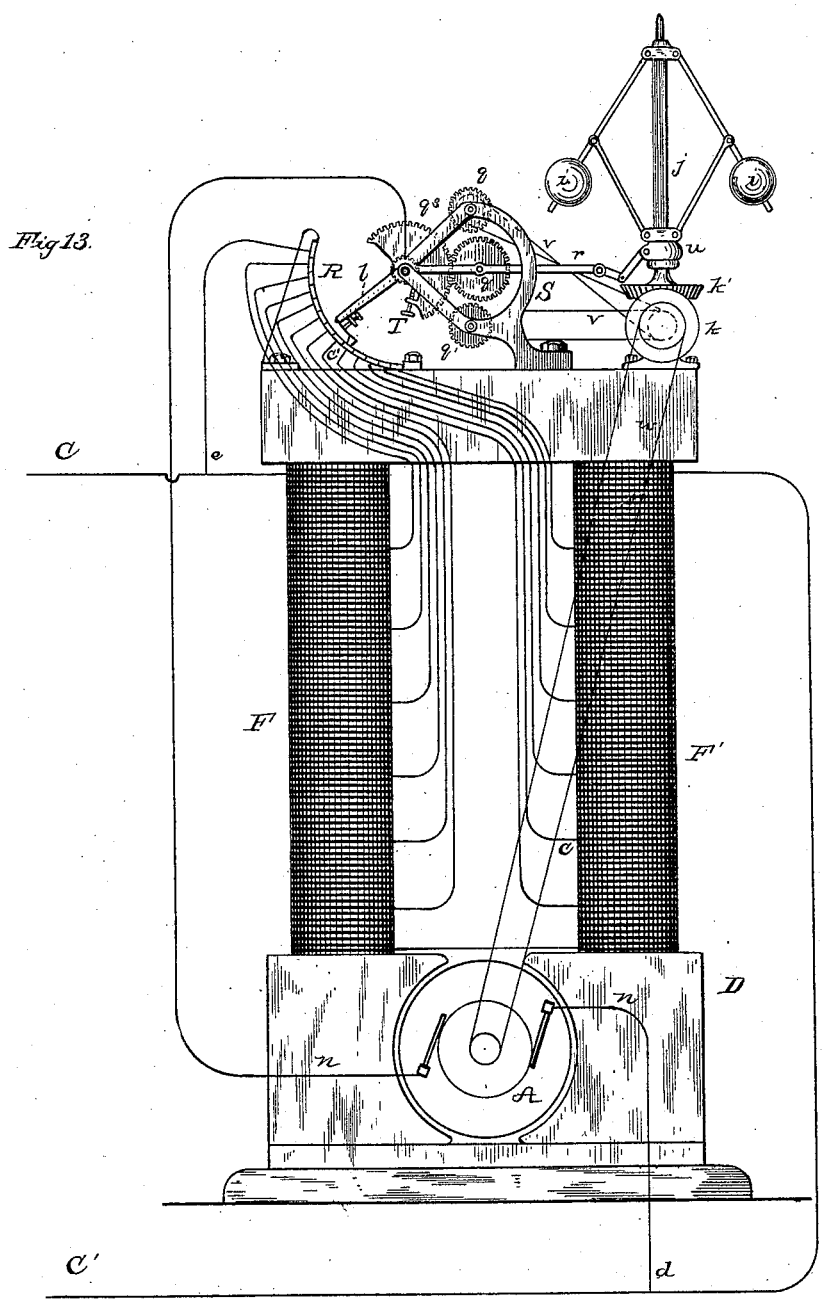

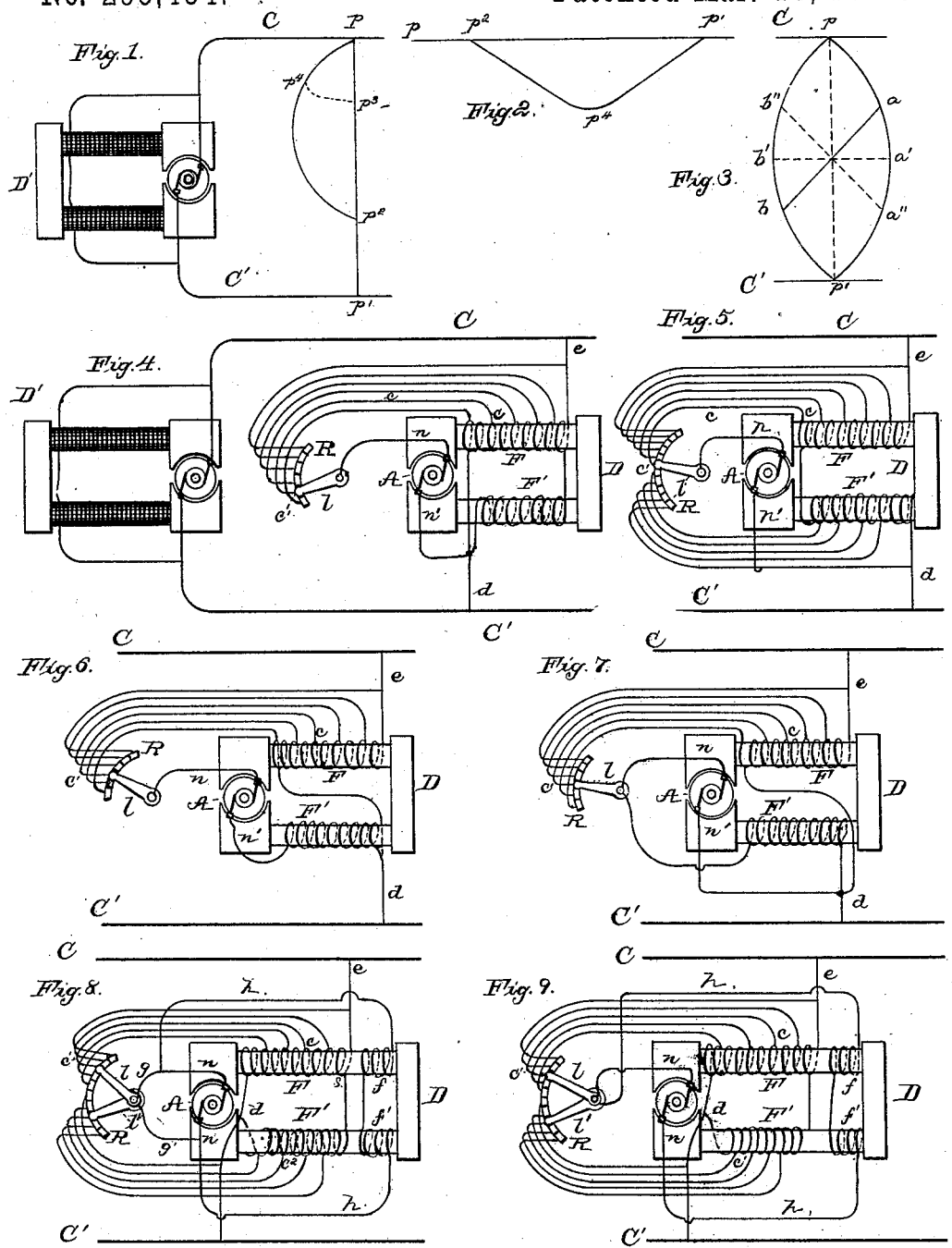

(No Model.) 3 Sheets—Sheet 2.
F. J. SPRAGUE.
ELECTRO DYNAMIC MOTOR.
No. 295,454. Patented Mar. 18, 1884.
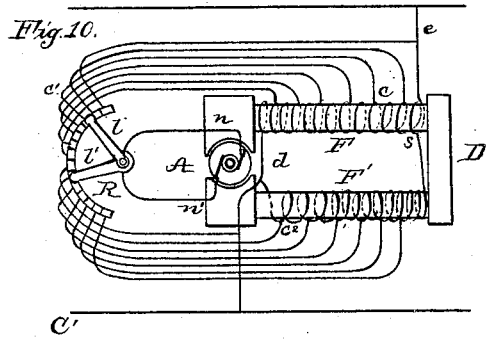
Fig. 10.
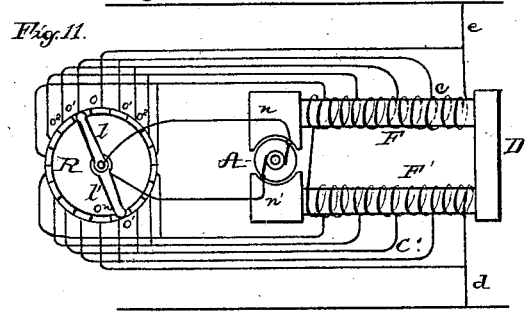
Fig. 11.
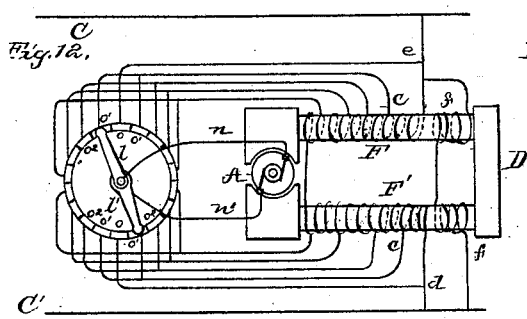
Fig. 12.
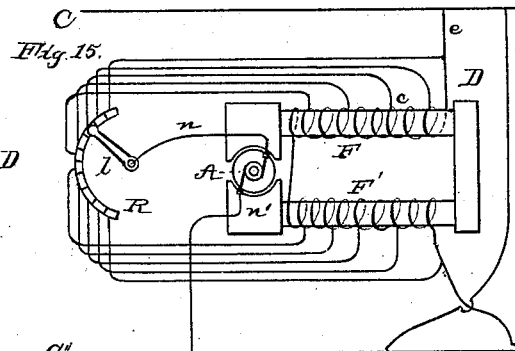
Fig. 13.
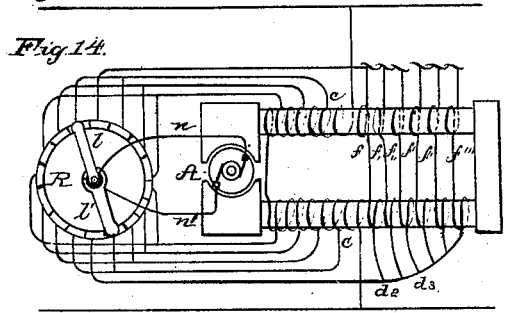
Fig. 14.
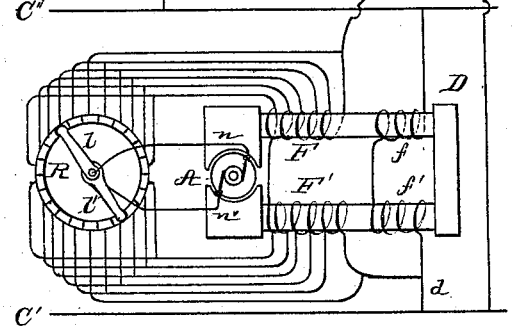
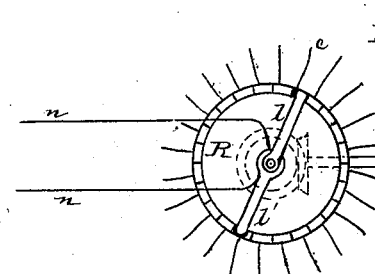
Fig. 16.
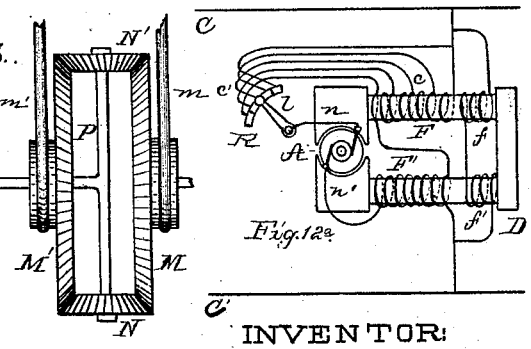
Fig. 12ª.
ATTEST:
E. C. Rowland
O. Bingham
INVENTOR:
Frank J. Sprague
By Rich'd N. Dyer
Atty (No Model.) 3 Sheets—Sheet 3.

F. J. SPRAGUE.
ELECTRO DYNAMIC MOTOR.

No. 295,454. Patented Mar. 18, 1884.

ATTEST:
E. E. Rowland
O. Burnham

INVENTOR:
Frank J. Sprague
By Rich'd N. Dyer
Atty.

United States Patent Office.

FRANK J. SPRAGUE, OF NORTH ADAMS, MASSACHUSETTS.

ELECTRO-DYNAMIC MOTOR.

SPECIFICATION forming part of Letters Patent No. 295,454, dated March 18, 1884.

Application filed May 2, 1883. (No model.)

*To all whom it may concern:*

Be it known that I, FRANK J. SPRAGUE, of North Adams, Berkshire county, Massachusetts, have invented certain new and useful Improvements in Electro-Dynamic Motors, of which the following is a specification.

Generally speaking, my invention relates to methods for varying the speed and direction of rotation of the movable parts of such motors, the power they can be made to transmit at any given speed, and means for automatically regulating the speed with varying loads. It is well-known that because of the convertibility of the dynamo-electric generator and motor a motor of given construction and fixed external conditions must be run at a certain speed to attain the greatest mechanical effect or the highest economy—that is, the highest efficiency; that as ordinarily wound, and under these fixed external conditions, the speed varies in an inverse manner with the load, and that with different speeds and loads the efficiency of the machine varies widely. To illustrate by a particular instance: If an electric motor derives its current, say, from conductors maintained at a fixed difference of potential, and no load is placed on it, the speed will be very great. Supposing always that the brushes are adjusted for maximum effect, a counter electro-motive force will be set up nearly equal to the difference of potentials existing at the mains, very little current will flow through the machine, and no appreciable work will be done save that of overcoming friction. In short, we will have high speed, no work, and little current. If a load be put on the pulley of the machine, the speed will be diminished and the current passing will be increased, because the counter electro-motive force is less. If the load is increased so that the motor is stopped, then no work will be done, but the greatest amount of current will be used. It is evident, then, theoretically—and this statement is upheld in practice—that at some intermediate stage—that is, when a current is flowing considerably less than that which would flow were the machine held at rest—the greatest amount of work and the most economical performance of the motor are to be found—that is, the highest efficiency both mechanical and commercial. With given external conditions, this speed and the work done depend upon the winding and arrangement of the motor-circuits and the general construction of the motor. I contemplate the supplying of currents from a general system of distribution—that is, one whose main conductors, whether arranged in a double or treble system, are maintained at a fairly constant difference of potentials, and from which currents may be taken for other purposes. I do not, however, confine myself to using the devices proposed on such a system alone, for motors arranged as I have devised can be used in series or on movable structures, as for the purposes of electric railways. I seek to be able, first, to vary the speed at will; second, to vary the power developed at any given speed; third, to maintain a fixed speed, or one varying only between narrow limits with varying loads; fourth, to maintain a high efficiency—in short, to vary automatically or at will the general arrangement of circuits in a motor so as to meet the various requirements of load and speed, and at the same time to preserve economy.

It is evident from the working of a steam-engine, and from the demands of all mechanical work, that the above requirements must be met in an electro-dynamic motor intended for general use. Again, from a commercial point of view, since the charges must be made to consumers by the amount of current used, which is of course the measure of the power used at the generating-station, for the satisfaction of either consumer or supplier, an electric motor must always be reasonably efficient and the current used proportional to the power developed.

It is also evident that in any general system the motor must, so far as regulation is concerned, be independent of the generators, and also that the introduction of otherwise useless resistances for regulating the strength of the current or the difference of potentials in any of the concerned circuits is a direct cause of loss in itself.

The present application is the first of a series of applications I propose to make to carry out the general idea of my improvements, and I will in these succeeding specifications more specifically describe and claim some points here only outlined.

Briefly, I propose, without interfering with the general circuit and without necessarily introducing otherwise useless resistances, to be able, first, to vary the relative potentials existing at the commutator-brush terminals in a progressive manner from the maximum existing on the main conductors to zero; second, to reverse the potential existing at the commutator-brush terminals without necessarily making or breaking the continuity of the field or armature circuits; third, to increase or diminish gradually the rotary effort of the armature and the current flowing through it; fourth, to vary the strength of the field-magnets; fifth, to accomplish these variations either at will by hand or other power, or automatically by the motor itself.

The accompanying drawings, chiefly diagrammatic, illustrating the principles and operation of my improvements, are as follows:

Figures 1 to 3 illustrate the variation of current in a simple shunt-conductor, whether in the main or a derived circuit, when one or both terminals of such shunt-conductor can be changed. Figs. 4 to $12^a$ illustrate various arrangements of circuits for practically accomplishing the regulation of a motor, as indicated. Fig. 13 illustrates one form of mechanical governor for automatically effecting the changes required. Fig. 14 illustrates a method of regulating the strength of a field other than as illustrated in Figs. 4 to 12. Fig. 15 illustrates two forms of motor-circuits applied to a set of three conductors, and Fig. 16 represents another form of automatic governor.

The figures can be much better understood by a detailed description of each than by any enumeration.

Fig. 1: $D'$ is the dynamo-electric generator, $C$ and $C'$ main conductors, and $p$ $p'$ derived circuits, either from the mains or from subsidiary conductors. The current flowing to magnetize the fields of the generators may be ignored. If $p$ $p'$ is the only circuit between these two points, or if it is a simple circuit, a current will flow over it proportional to the difference of potentials existing at the ends of the conductor, and inversely proportional to the resistance. Suppose we wish to take off a current from the point $p^1$ of given strength when the conductor has a fixed resistance. Manifestly we must have a means for varying the resistance of this second conductor, or of varying the difference of potential between the point $p$ and the other terminal of the conductor. Let $p$ $p^1 p^2$ be such a second conductor. If the point $p^2$ be moved along $p$ $p'$, a difference of potentials can be obtained at the points $p$ $p^2$, varying from the maximum at the conductors $C$ $C'$ to zero, and any desired current from the maximum to zero obtained. Instead of moving one terminal $p''$ to $p'''$, both terminals can be made to approach each other, and after passing to recede from each other. If this is done, the current in $p$ $p^1$ $p^2$ will decrease gradually to zero, then begin to increase, but flowing now in the opposite direction, so that the maximum and minimum currents, with change of direction, can be obtained without making or breaking any circuit, and in a perfectly progressive manner. In Fig. 2 this arrangement is shown where the conductor $p$ $p^2$ $p'$ and the shunt $p^2$ $p^1$ $p'$ are in the main circuit—that is, a series arrangement. Precisely the same effect can be produced as described in reference to Fig. 1 if the terminal $p^2$ be made to approach or recede from $p$, or if $p^2$ $p'$ be made to approach, pass, and recede from each other.

In Fig. 3 the Wheatstone-bridge principle is illustrated both on a derived circuit and in wires on the mains. Let $p$ $a$ $p'$ and $p$ $b$ $p'$ be two circuits, and $a$ $b$ a shunt-circuit between them. If $a$ $b$ has the dotted position $p$ $p'$, the maximum current will flow as indicated. As $a$ approaches the position $a'$, and $b$ that of $b'$, the current in $a$ $b$ diminishes, and when occupying the position $a'$ $b'$—that is, with equal ratios of resistances in the two parts of the conductors $p$ $a$ $p'$ and $p$ $b$ $p'$—no current at all flows. As $a$ passes $a'$ to $a''$, and $b$ passes $b'$ to $b''$, the current again flows in $a$ $b$, as indicated in $b''$ $a''$—that is, in the opposite direction to what it had before—and as $a''$ comes to $p'$ and $b'$ to $p$ the maximum reverse current is attained. Here, too, there has been a perfectly progressive change of strength and direction of current in the shunt-conductor. If any other independent circuits joined $p$ $p'$, the current in these independent circuits would be independent of the changes in the circuits considered, provided $p$ and $p'$ remained at the same difference of potentials. There would be a change in the currents flowing in the different parts of the conductors $p$ $a$ $p'$ and $p$ $b$ $p'$; but it is just now unnecessary to enter into what would be an elaborate mathematical consideration of this. The relative changes in all these circuits would depend upon the difference of potentials existing at the mains $C$ $C'$ and the resistances of the several circuits. If, for any reason, a counter electro-motive force were set up in the shunt-circuit, the currents flowing in the several parts would be materially modified, but the current in the shunt more than in the direct circuits. It will be noticed that the variation of currents in the shunt-circuit was attained without the introduction of any resistance into the shunt-circuit proper or the throwing in or out of any resistances at all.

The first part of my invention relates to the method of utilizing the principles illustrated. An electric motor having an armature and an electro field-magnet with one or more circuits affords the necessary resistances for attaining any desired potential up to a certain limit that may be desired. I propose, in brief, to make a field-circuit take the place of the conductor $p$ $p^2$ $p'$ in Figs. 1 and 2, or two field-circuits the places of the conductors $p$ $a$ $p'$ and $p$ $b$ $p'$ in Fig. 3, and to make the armature-circuit take the place of the shunt-circuits $p\ p^4\ p^2$ in Fig. 1, $p^2\ p^4\ p'$ in Fig. 2, or $a\ b,\ a'\ b',\ a''\ b''$ in Fig. 3. I further propose to supplement these field-circuits, if necessary, by others, which may be placed in series or on a shunt with the armature-circuit, or may derive their current independently from the mains.

The field of an ordinary series dynamo generator or motor has a resistance from one to three or four times that of the armature, and in a shunt generator or motor the resistance of the field-circuits is from three or four to six hundred times that of the armature. These proportions of resistances give ample latitude for breaking up the field-circuits, or generally adapting them to my purpose.

In practice I prefer to wind the field-magnets with a series of coils of the same or different sizes and resistances of wire, and from the junction of these coils bring connecting-wires to one or more ranges of insulated contact-pieces arranged preferably, but not necessarily, in the arc of a circle.

In the simplest form of my invention one end of the armature-circuit is connected with a contact-arm arranged to travel over a contact-range, thereby making electrical connection with different sections of the field-coils. The other end of the armature-circuit is connected with one end of the series of field-coils, preferably at the junction of such series with the supplying-circuit. As the arm moves over the successive contacts the armature is shunted around a greater or less number of the sections of the field-coils, and the difference of potential between the terminals of the armature-circuit is varied between the maximum and zero; but in this arrangement it is not reversed unless the connections are reversed. The contact-arm is preferably provided with an adjustable contact-piece, to allow for wear. In another method, where a single set of field-coils is broken up into sections, the wires from the bights are connected in a special manner (which will be more particularly described with reference to the drawings) to a circular range of contact-pieces, and a double arm, the two parts insulated from each other and bearing on opposite sections, is used. To each of the arms is connected an end of the armature-circuit, and as the arms are made to travel around the contact-range the difference of potentials at the arms or the brush terminals is reduced from the maximum to zero, is then reversed, and increases; and if the arms continue in the same direction another half-revolution it is diminished to zero, changed again, and increased to the original maximum. The connections of the field-sections are made: the first and last to single and opposite blocks of the range; the next adjacent sections have double connections to the next adjacent blocks on either side of the first ones connected, the next sections to the next adjacent pairs of blocks on either side, and so on till the blocks meet. In a third method two series of field-coil sections are used, and the bights connected to two ranges of contact-pieces arranged in one or two circular or partly circular sets. Here, too, two arms insulated from each other are used, and the two arms are connected to the two terminals of the armature-circuit—that is, the armature-circuit becomes what corresponds to the galvanometer-circuit in the Wheatstone bridge. As the arms are made to travel over the successive contact-surfaces, the difference of potential existing at these arms or at the terminals of the armature-circuit decreases from the maximum to zero, changes, and increases again to the maximum reverse potential.

Besides the simple arrangement of circuits already described, I propose also to introduce other independent or dependent field-circuits. There may be a set or several sets of coils deriving their current directly from the mains, or one or more sets placed in the armature-circuit in series or in parallel circuit with the armature-coils. Then every change of potential at the terminals of this circuit affects these particular field-coils in the same way as it does the armature itself.

In Fig. 4, D' represents a dynamo-electric machine, of which one or more may be used for supplying current to the electro-dynamic motors. In all the figures except 1 and 4 the generator is omitted, the main conductors C C', which extend to such generator, being, however, shown in most of them. In each figure except Fig. 16, D is a motor, the different motors shown being variously wound and connected.

Fig. 4 shows a range of sectional field-coils and an independent shunt-circuit, F'. Current entering at $e$ comes to point $s$, divides, one part passing around coil F', the other passing around F until it reaches $c$, when it again divides, part passing to $d$ and the rest through $c\ c'\ l\ n$ A $n'$ to $d$. The shifting of $l$ determines the amount shunted, and thus varies the power of motor.

Fig. 5 shows a range of sectional field-coils, F F'. Current enters at $e$, passes around F to $c$, divides, one part passing over remainder of F and F' to $d$, and the rest over $c\ c'\ l\ n$ A $n'$ to $d$. Arm $l$ has the same function as before.

Fig. 6 shows a single range of sectional field-coils, F, and a range, F', in series with the armature. Current enters at $e$, passes around F to $c$, divides, one part passing over the remainder of F to $d$, and the other through $c\ c'\ l\ n$ A $n'$ and around F' to $d$. Arm $l$ has the same function as before.

Fig. 7 shows a single range of sectional field-coils, and a range, F', in parallel circuit with the armature-coils. Current enters at $e$, passes around F to $c$, divides, one part passing around the remainder of F to $d$, and the other over $c$ $c'$ to $l$, where this also divides, part passing over $n$ A $n'$ to $d$, and the rest over the field-coils F' to $d$. Arm $l$ has similar function as already described.

Fig. 8 shows a Wheatstone-bridge arrangement with supplemental field-coils $f f'$ in parallel circuit with the armature-coils. Current enters at $e$, divides at $s$, whence it has two paths direct to $d$ over the two sectional ranges of field-coils F F'. At point $c$, however, part of the current is shunted off, due to whatever difference of potentials exists between $c$ and $c^2$. This shunted current passes over $c$, $c'$, $l$, and $g$, where it divides, part passing over $n$, A, and $n'$ to $g'$, and the other part over $h$, $f$, $f'$, and $h$ to $g'$, whence the united parts flow over $l'$ to $c^2$ on the second range. Arms $l$ and $l'$ determine not only the difference of potential existing, but also which terminal shall be the highest. If passing the zero-point, it would be necessary to shift terminals of $h$ $h$.

Fig. 9 shows a Wheatstone-bridge arrangement, same as in Fig. 8, except that the current, after leaving $l$, passes through the armature-coils and the supplemental field-coils in series, instead of in parallel circuit, over the path $n$ A $n'$ $h$ $f'$ $f$ $h$ to $l'$. The arms $l$ $l'$ perform the same function as in Fig. 8, and the same necessity arises for changing the connections $h$ $h$ if changing the direction of current. Of course, this change can be automatic.

Fig. 10 shows a simple Wheatstone-bridge arrangement without any supplemental coils. The whole of the shunted current passes through the armature, over the path $l$ $n$ A $n'$, to $l'$. The arms $l$ $l'$, as before, determine the potential and direction of rotation.

Fig. 11 shows a single range of sectional field-coils, with reversing arrangement for armature. The connections to R are as follows: The first, or connection nearest the main C, is joined to one block, $o$; likewise the last one to the opposite block $o^n$. The next connection or bight, $c$, is joined to the two adjacent blocks $o'$ $o'$ on either side of $o$; likewise the next to the last connection or bight to the corresponding blocks on the opposite side. The next succeeding bight—the third—is joined to the next adjacent blocks on either side, $o^2$ $o^2$, and so on. As the arms are rotated the actual points in electrical connection with $l$ and $l'$ approach each other. When on $o$ and $o^n$, the maximum difference of potential exists. At right angles to this position there is no difference, and as the arms are rotated in the same direction the potential is reversed, and increases in difference till, when a half revolution is completed, the maximum reverse potentials exist at $l$ $l'$, and so on. As shown, the current enters at $e$, passes around F and F', and out at $d$; but at $c$ a part is shunted off and passes over $c$ $o'$ $l$ $n$ A $n'$ $l'$ $o'$ $c'$ to $d$. It is evident that supplemental coils could be introduced into the armature-circuit in series or in parallel circuit with the armature-coils, as shown in Figs. 8 and 9.

Fig. 12 is a precisely similar arrangement to that shown in Fig. 11, and the same remarks explain its action, with this exception, that independent field-coils $f f'$ are used, deriving their current from the circuit $e$ $d$ or C C'. There may be one or more of these supplemental coils.

In Fig. 12$^a$ the independent field-coils $f f'$ are shown in connection with the sectional coils F and the supplemental coils F', the last being in series with the armature, as in Fig. 6, though they may of course be in parallel circuit with the armature, as in Fig. 7.

Various other arrangements of field-coils may be made, and other forms of field-magnets; but it is unnecessary to describe such in detail. The number of convolutions in each of the series, the resistances, &c., may be such as to give the best electrical arrangements, and hence are not necessarily equal; hence it follows that high and low resistance coils may be used in series, and the low-resistance ones only be sectional, if so desired. The one common principle in all these arrangements is the making use of a range of sectional field-coils and the variation or reversing by progressive steps of the differences of potential existing at the terminals of the armature-circuit, and consequently the current flowing therein, by electrically connecting such terminals to different parts of the sectional field-coils, and one or more armatures or armature-circuits, as well as one or more ranges or sets of field-coils, can evidently be used.

While varying the potentials and currents in the armature and field-coils as proposed, it may be requisite to vary the strength of the field-magnets independently.

Fig. 14 illustrates a method of doing this where the sectional arrangement is the same as in Fig. 11. The method I propose is to wind a part of the field-magnets with several distinct coils joined in parallel circuit. These coils may be wound together or separately. They are shown in the figure as separate $f f, f_{,,} f' f'' f'''$. At one terminal they are joined permanently, $d^2$ $d^3$, at the other by a multiple-contact switch, or by a range of break-circuit switches, the depressing of any of which cuts out all the coils to the right of it. In the figure three of the sets are cut out by depressing the switch, as shown.

The arrangements described have been shown applied to a system of two conductors. It is evident that the same principles are applicable to a system of three or more conductors, such as is set forth in the patent of Thomas A. Edison, No. 274,290, and with even a greater variety of local arrangements. Fig. 15 shows two such arrangements. Two dynamos are joined in series, C and C' being the main-supply conductors, and C'' a third conductor, which may or not be in action, it being rather a safety or balance conductor than a main supply. The upper of the two motors has a sectional range of field-coils, F F', supplied from the extreme main C C'. One terminal of the armature-circuit is joined to the middle conductors, and the other end to the arm $l$ in contact with R. By this arrangement the movement of $l$ not only changes the amount of the difference of potentials at the terminals of the armature-circuit, but reverses it, the position of zero potential being when the arm is on the middle block. In the lower motor the same arrangement of circuits obtains as explained in Fig. 12, except that the range is between the two extreme conductors C C', and the independent circuit between one of the extremes, C', and the middle one, C''. Any of the arrangements shown for two conductors can be made with either two of these three.

The second part of my invention relates to a method for making the regulation of the motor automatic, and relates particularly to the maintaining of a constant speed as well as the determination of this constant speed. There are three methods which may be used. A centrifugal governor may be used, the position of whose parts depends upon the speed. The movable sleeve or collar may be attached to the arm or arms $l\ l'$, so that any variation of speed which may be caused by a variation of load will cause a shifting of position of the arm and a consequent variation of potential at the armature-circuit terminals. To this there is the strong objection that to accomplish the desired change of potential other than a normal speed must be maintained, thus vitiating the intended action of a governor and causing a constant variation of speed. By a second method—that illustrated in Fig. 13—the centrifugal governor may be an intermediary only, by which, when the speed varies by any predetermined amount or percentage from the normal, a secondary apparatus is thrown into action, which secondary apparatus derives its motion from the motor itself or from an independent source of power, and which continues in action to move the arm or arms $l\ l'$ as long as the speed of the motor is other than normal.

In Fig. 13, D is the motor; F F', field-magnet coils wound in sections, the bight being connected to the range of contact-pieces R; $i\ j\ i$, a centrifugal governor, with movable collar $u$, the governor receiving motion from the armature A through belt $w$ and bevel-wheels $k\ k$. The belts $v\ v$ communicate motion to two toothed wheels, $q\ q'$, mounted in the frame S. This frame supports another wheel, $q^3$, and an arm, $r$, pivoted to the same axis, carrying another small wheel, $q^2$, which engages $q^3$, and is connected by adjustable joint $r'$ to the collar $u$. According as $u$ rises or falls, the arm $r$ is carried up or down, and $q^2$, engaging $q$ or $q'$, communicates motion in one way or the other to $q^3$, and thence to the adjustable arm $l$. This motion continues until the speed is restored to its normal, when $q^2$ is left free. Several mechanical devices may be used. A brake may be tightened or loosed; an arm having reciprocating motion may be thrown into action; or an air, water, steam, or electric motor may be set in operation to move the arm $l$. A tangent-screw, T, allows an independent setting of the arm $l$.

I do not confine myself to any particular mechanical arrangements for causing the desired motion of the arm $l$, and I propose the application of the various mechanical arrangements to the different electrical conditions shown in Figs. 4 to 15. The principles of this part of my invention relate to the combination of a speed-governor, a secondary mechanism which is, at abnormal speeds, thrown into action, the adjustable arm $l$, or arms, the range of contact-surfaces, and the general electrical connections heretofore set forth, for the purpose of automatically accomplishing the various relative changes of electrical circuits in an electric motor. Another automatic arrangement embodying this same principle I propose for larger motors is the combination of two oppositely-placed bevel-wheels engaging small bevels on a loose spindle, one bevel to derive motion from the motor, the opposite from an independent source of power whose speed can be governed, and the spindle to be connected with the movable potential arm. Any variation of speed on the part of the motor will cause the spindle to travel one way or the other, according as the opposite bevel-wheel is moving at a faster or slower speed. This is illustrated in Fig. 16, in which M M' are the two opposite bevel-wheels, the former being operated from the motor-armature through belt $m$, and the latter from an independent source of power through belt $m'$. These bevels engage with the small bevels N N' on the loose spindle P. The arms $l\ l'$ are moved upon the contact-range R, as above explained.

In all the arrangements above described it is evident that the field-coils may be divided into layers instead of in longitudinal sections, and the connections made in the same manner, as explained.

I propose, in subsequent specifications, to more particularly describe and claim certain mechanical constructions founded on these principles; and it is to be understood that all patentable features of invention shown or described but not claimed herein are reserved for protection by other patents, and will be embodied in other applications for Letters Patent.

Certain of the devices herein described might be used to vary the field of the motor to regulate its speed; but this method of regulation is not claimed herein, being fully set forth and claimed in my application Serial No. 121,487; neither do I claim herein, broadly, the method set forth of varying the armature-current, in combination with means for regulating the strength of the field, this also being claimed in the application just referred to.

Having thus described my invention, what I claim as new and useful, and pray that Letters Patent may be granted me, is the following:

1. In an electro-dynamic motor, the combination of sections of field-coils, the armature in a shunt-circuit around a variable number of said sections, and means for varying the relation between the number of sections around which the armature is shunted and the number with which said armature is in series, substantially as set forth.

2. In an electro-dynamic motor, the combination of sections of field-coils, the armature in a shunt-circuit around all or a part of said coils, means for varying the number of sections of coils around which the armature is shunted, and means for reversing the current in said armature-shunt, substantially as set forth.

3. In an electro-dynamic motor, the combination of sections of field-coils, the armature in a shunt-circuit around all or a part of said coils, means for varying the number of coils around which the armature is shunted, and supplemental field-coils connected with the armature-circuit, substantially as set forth.

4. In an electro-dynamic motor, the combination of sections of field-coils, the armature in a shunt-circuit around all or a part of said coils, means for varying the number of coils around which the armature is shunted, and supplemental field-coils in parallel circuit with the armature, substantially as set forth.

5. In an electro-dynamic motor, the combination of sections of field-coils, the armature in a shunt-circuit around all or a part of said coils, means for varying the number of coils around which the armature is shunted, means for reversing the current in said armature circuit, and supplemental field-coils connected with said armature-circuit, substantially as set forth.

6. In an electro-dynamic motor, the combination of sections of field-coils, the armature in a shunt-circuit around all or a part of said coils, means for varying the number of coils around which the armature is shunted, and independent field-coils connected with the supplying-circuit, substantially as set forth.

7. In an electro-dynamic motor, the combination of sections of field-coils, the armature in a shunt-circuit around all or a part of said coils, means for varying the number of coils around which the armature is shunted, supplemental field-coils connected with the armature-circuit, and independent field-coils connected with the supplying-circuit, substantially as set forth.

8. In an electro-dynamic motor, the combination of two ranges of sectional field-coils, the armature in a shunt-circuit between the ranges, means for changing the connections of the armature-circuit terminals from one field-section to another, and means for reversing the currents in the armature-circuit, substantially as set forth.

9. In an electro-dynamic motor, the combination of one or more ranges of sectional field-coils, one or more ranges of contact-blocks in electrical connection with the junctions of the field-sections, and one or more movable arms in electrical contact with said blocks, said arm or arms forming part of a shunt-circuit including the armature, substantially as set forth.

10. In an electro-dynamic motor, the combination of two ranges of sectional field-coils, electrical connections from the junctions of the sections to contact-blocks, and two arms in electrical contact with said blocks and forming the terminals of the armature-circuit, substantially as set forth.

11. In apparatus for regulating electro-dynamic motors, the combination, with sections of field-coils and the armature in a shunt around all or a part of said coils, of means operating automatically upon variations in the speed of said motor for varying the number of coils around which the armature is shunted, substantially as set forth.

12. In regulating apparatus for electro-dynamic motors, the combination of mechanism operated by variations in the speed of the motor, secondary mechanically-operated apparatus thrown into action by the movements of said primary mechanism, and means operated by said secondary apparatus for varying the current supplied to the motor-armature, substantially as set forth.

13. In an electro-dynamic motor, the combination of sections of field-coils, the armature in a shunt around such coils, means for varying the number of coils around which the armature is shunted, independent field-coils connected with the supplying-circuit, and means for varying the magnetizing effect of said independent coils, substantially as set forth.

14. The combination of sectional field-coils, a circular commutator, two movable arms, bearing on said commutator and forming terminals of a shunt-circuit, and connections from the junctions of said sectional coils to the plates of said commutator, whereby the current in the shunt is varied and reversed by the movement of said arms, substantially as set forth.

15. The combination of sections of coils, a circular commutator, two movable arms bearing on opposite blocks of said commutator and forming terminals of a shunt-circuit, and connections from the sectional coils to the commutator, as follows: (see Fig. 11,) the first and last sections connected, respectively, to opposite blocks $o$ $o^n$, the second and next to last sections connected each to two blocks, $o'$ $o'$, and so on until the blocks meet, substantially as shown and described.

16. The method of regulating electro-dynamic motors, consisting in varying the relations between the number of field-magnet coils in series with the armature and the number around which the armature is shunted.

London, England, April 19, 1883.

FRANK J. SPRAGUE.

Witnesses:
WM. J. HAMMER,
CHAS. I. PETHERICK.